(12) United States Patent
Yang et al.

(10) Patent No.: US 10,890,903 B2
(45) Date of Patent: Jan. 12, 2021

(54) REAL-TIME GAS TURBINE SIMULATION SYSTEM AND EXECUTION METHOD THEREOF

(71) Applicant: Doosan Heavy Industries & Construction Co., LTD., Changwon-si (KR)

(72) Inventors: Ki Dong Yang, Daejeon (KR); Sung Ho Kim, Yongin-si (KR); Seong Jin Hong, Daejeon (KR)

(73) Assignee: Doosan Heavy Industries & Construction Co., LTD, Gyeongsangnam-do (KR)

( * ) Notice: Subject to any disclaimer, the term of this patent is extended or adjusted under 35 U.S.C. 154(b) by 402 days.

(21) Appl. No.: 15/924,989

(22) Filed: Mar. 19, 2018

(65) Prior Publication Data
US 2018/0284750 A1    Oct. 4, 2018

(30) Foreign Application Priority Data
Mar. 17, 2017    (KR) .................. 10-2017-0033718

(51) Int. Cl.
*G05B 23/02*    (2006.01)
*F02C 9/48*    (2006.01)
(Continued)

(52) U.S. Cl.
CPC ............ *G05B 23/0243* (2013.01); *F02C 9/48* (2013.01); *G05B 13/041* (2013.01); *F02C 9/20* (2013.01);
(Continued)

(58) Field of Classification Search
CPC ................ G05B 23/0227; G05B 13/04; G05B 23/0256; G05B 23/0243; G05B 13/041;
(Continued)

(56) References Cited

U.S. PATENT DOCUMENTS 6,122,572 A * 9/2000 Yavnai ................. G05D 1/0088
                                                                 342/13
9,354,141 B1 * 5/2016 McElrath .................. F02C 9/40
(Continued)

FOREIGN PATENT DOCUMENTS

EP        2645195 A      10/2013
EP        18162266.3       7/2018
(Continued)

OTHER PUBLICATIONS

2018-044798 Office Action dated Feb. 28, 2019 (Korean).
2018-044798 Office Action dated Feb. 28, 2019 (Translation).

*Primary Examiner* — Kandasamy Thangavelu
(74) *Attorney, Agent, or Firm* — Kwang Jun Kim; J D Harriman; Foundation Law Group LLP (57) ABSTRACT

Disclosed herein are a real-time gas turbine simulation system and an execution method thereof, capable of verifying input and output signals of an actual gas turbine control system (GTCS) by simulating a gas turbine in real time to reduce trial and error in power plant operation in a gas turbine power generation system. The real-time gas turbine simulation system simulates a gas turbine to verify a GTCS for controlling a gas fuel through an actuator/sensor module and a safety integrity level (SIL) protection function through a protection module for the gas turbine, and includes a hardwire-in-the-loop (HIL) simulator connected to the actuator/sensor module and the protection module through one or more hardwires to simulate a time critical portion of the gas turbine in real time, and a network simulator connected to the GTCS through a network to simulate a non-time critical portion of the gas turbine in real time.

17 Claims, 5 Drawing Sheets

(51) Int. Cl.
*G05B 13/04* (2006.01)
*F02C 9/20* (2006.01)

(52) U.S. Cl.
CPC ...... *F05D 2220/32* (2013.01); *F05D 2260/81* (2013.01); *F05D 2270/09* (2013.01)

(58) Field of Classification Search
CPC .. G05B 23/0267; F02D 41/26; G05D 1/0088; G06F 30/20; G06F 30/33; G06Q 50/06; F02C 9/48; F02C 9/20; F05D 2220/32; F05D 2270/09; F05D 2260/81; F01D 21/003; G01M 15/14
See application file for complete search history.

(56) References Cited

U.S. PATENT DOCUMENTS

| | | | | |
|---|---|---|---|---|
| 10,372,847 | B2* | 8/2019 | McKinley | G06Q 50/06 |
| 2005/0120320 | A1* | 6/2005 | Uozumi | G06F 30/33 |
| | | | | 702/182 |
| 2007/0100478 | A1* | 5/2007 | Egeland | G05B 23/0256 |
| | | | | 700/45 |
| 2013/0166271 | A1* | 6/2013 | Danielsson | G06F 30/20 |
| | | | | 703/22 |
| 2018/0119629 | A1* | 5/2018 | Cline | F02D 41/26 |
| 2018/0135530 | A1* | 5/2018 | Ewens | F02C 7/232 |
| 2018/0137277 | A1* | 5/2018 | Mestha | G05B 23/0227 |
| 2018/0187608 | A1* | 7/2018 | Thazhathil Koyampurath | |
| | | | | G05B 13/04 |

FOREIGN PATENT DOCUMENTS

| | | |
|---|---|---|
| JP | 2001318715 A | 11/2001 |
| JP | 2004341814 A | 12/2004 |
| JP | 2001318716 A | 11/2011 |
| JP | 2012003489 A | 1/2012 |
| JP | 2013-117752 A | 6/2013 |
| JP | 2014006178 A | 1/2014 |
| JP | 20144160646 A | 9/2014 |
| JP | 201441160646 | 9/2014 |
| JP | 2015510079 | 4/2015 |
| JP | 2015510079 A | 4/2015 |
| JP | 2013-117752 A | 6/2016 |
| KR | 10-1006024 | 1/2011 |
| KR | 10-1006024 B | 1/2011 |
| KR | 10-2017-0033718 | 5/2018 |
| WO | 02/03150 A | 1/2002 |

* cited by examiner

REAL-TIME GAS TURBINE SIMULATION SYSTEM AND EXECUTION METHOD THEREOF

CROSS-REFERENCE(S) TO RELATED APPLICATIONS

This application claims priority to Korean Patent Application No. 10-2017-0033718, filed on Mar. 17, 2017, the disclosure of which is incorporated herein by reference in its entirety.

BACKGROUND

Field

Exemplary embodiments of the system relate to a real-time gas turbine simulation system and an execution method thereof, and more particularly, to a real-time gas turbine simulation system and an execution method thereof, capable of verifying input and output signals of an actual gas turbine control system (GTCS) by simulating a gas turbine in real time to reduce trial and error in power plant operation in a gas turbine power generation system that produces electricity by driving a turbine with gas fuel.

Description of the Related Art

In general, a power plant simulator includes a process model for simulating a power plant, a control model for simulating a control system, an instructor control panel that allows for fault simulation, remote tests, etc., an operator control panel connected to the process model and the control model to control the operation of power generation equipment, a software panel for monitoring and operating process variables, and the like.

This power plant simulator comprises an emulated simulator, a stimulated simulator, a virtual simulator, and a hybrid simulator according to the method of implementing the control model and the operator control panel.

The stimulated simulator is of a type that is implemented using the same operator console and control hardware as a control system on a power plant site and has been being discontinued in recent years. The virtual simulator is of a type that is implemented using the same operator console as a control system on a power plant site and a virtual control system performing the same function as the control system on the power plant site. The stimulated simulator and the virtual simulator have an advantage of being capable of implementing a control model and an HMI (Human Machine Interface) using the control logic and HMI electronic file of the control system on the power plant site as they are. The stimulated simulator and the virtual simulator are easily developed, in that power plant data is used to implement the control model and the HMI, and have high accuracy, but they can be implemented only when the control system is supplied from a control system manufacturer. In addition, they are disadvantageous in that the construction cost thereof is high and the maintenance thereof is difficult compared to other types of simulators. The hybrid simulator is implemented by emulating the HMI as well as the control model. Examples of the method of emulating the HMI include a method of developing a conversion program for execution in a simulator development environment, and a method of using the GUI of the simulator development environment for direct implementation. However, the hybrid simulator is disadvantageous in that it is difficult to implement the hybrid simulator using the simulator development environment and to use a database since the internal operation mode of the HMI varies depending on the HMI manufacturer on the power plant site and the connection with the control model is complicated.

Particularly, in a gas turbine power generation system that produces electricity by driving a turbine with gas fuel, since input and output signals are verified using network communication when a gas turbine is simulated to verify a gas turbine control system (GTCS) for controlling the gas turbine, there is a problem in that items requiring verification are not verified in real time.

[Patent Document] Korean Patent No. 10-0585595 (issued on May 25, 2006, and entitled "METHOD FOR SIMULATING GAS TURBINE")

SUMMARY OF THE DISCLOSURE

An object of the system is to provide a real-time gas turbine simulation system and an execution method thereof, capable of verifying input and output signals of an actual gas turbine control system (GTCS) by simulating a gas turbine in real time to reduce trial and error in power plant operation in a gas turbine power generation system that produces electricity by driving a turbine with gas fuel.

Other objects and advantages of the system can be understood by the following description and become apparent with reference to an embodiment of the system. Also, it is obvious to those skilled in the art to which the system pertains that the objects and advantages of the system can be realized by the means as claimed and combinations thereof.

In accordance with one aspect of the system, a real-time gas turbine simulation system simulates a gas turbine to verify a gas turbine control system (hereinafter, referred to as "GTCS") for controlling a gas fuel through an actuator/sensor module and controlling a safety integrity level (hereinafter, referred to as "SIL") protection function through a protection module for the gas turbine, and includes a hardwire-in-the-loop (hereinafter, referred to as "HIL") simulator connected to the actuator/sensor module and the protection module through one or more hardwires to simulate a time critical portion of the gas turbine in real time, and a network simulator connected to the GTCS through a network to simulate a non-lime critical portion of the gas turbine in real time.

The HIL simulator may transmit and receive actuation signals or sensor signals relating to the fuel control to and from the actuator/sensor module and may transmit and receive data or signals relating to the SIL protection to and from the protection module, through a time critical function.

The HIL simulator may receive data or signals relating to the fuel control and the SIL protection from the network simulator and the GTCS in real time to simulate the fuel control and protection function of the gas turbine.

The HIL simulator may transmit and receive data or signals to and from the actuator/sensor module and protection module of the GTCS for each of a predetermined period of time, e.g. every 1 ms or less.

The network simulator may transmit and receive data or signals to and from the GTCS through the network for each of a predetermined period of time, e.g. every 100 ms or less.

The HIL simulator may be connected to the network simulator through a hardwire or a network (e.g. Ethernet), and time synchronization and model synchronization may be performed between the HIL simulator and the network simulator in order for the HIL simulator and the network simulator to operate similarly to an actual gas turbine.

The HIL simulator may include an input/output board for transmitting and receiving data or signals, relating to valve control commands and conditions for gas turbine operation control and conditions, gas turbine speed and output, and gas pressure, to and from the GTCS, a main gas turbine model configured to generate control and operation signals suitable therefor in response to the data or signals input through the input/output board to output or use the control and operation signals for calculation, and a processor board configured to send the data or signals input through the input/output board to the main gas turbine model or send an operation result of the main gas turbine model to the input/output board.

The input/output board may include a signal conditioning unit configured to convert analog signals input from the GTCS into digital data to input the digital data to the main gas turbine model or to adjust output signals of the main gas turbine model to input specifications of the actuator/sensor module, and a communication (COM) unit for performing network communication with the GTCS to transmit and receive data or signals to and from the network simulator.

The network simulator may include a communication unit for communication with the HIL simulator or the GTCS, an auxiliary gas turbine model configured to simulate the gas turbine in response to data or signals, relating to auxiliary control and non-SIL protection control, received through the communication unit from the GTCS, and a workstation unit configured to send simulation operation signals of the HIL simulator and the network simulator input from a user to a main gas turbine model and the auxiliary gas turbine model and to display an operation state of the gas turbine, based on operation results of the main gas turbine model and the auxiliary gas turbine model, such that the user checks the operation state of the gas turbine.

The real-time gas turbine simulation system may further include a database configured to store data or signals indicative of normal operation states of the HIL simulator and the network simulator when the HIL simulator and the network simulator are initially operated and then normally operated after a certain time elapses, and when the HIL simulator and the network simulator are initially operated, they may be operated in the normal operation states in response to the data or signals, indicative of the normal operation states, stored in the database.

In accordance with another aspect of the system, a real-time gas turbine simulation method, in a system in which a hardwire-in-the-loop (hereinafter, referred to as "HIL") simulator is connected to a gas turbine control system (hereinafter, referred to as "GTCS") through one or more hardwires and a network simulator is connected to the GTCS through a network, includes (a) controlling a gas fuel through an actuator/sensor module and controlling a safety integrity level (hereinafter, referred to as "SIL") protection function through a protection module for a gas turbine in the GTCS, (b) performing time synchronization and model synchronization between the HIL simulator and the network simulator, (c) performing a simulation by receiving data or signals in real time through the actuator/sensor module or the protection module in the HIL simulator, and (d) performing a simulation relating to auxiliary control and non-SIL protection control, except for the fuel control and the SIL protection function control, in real time in the network simulator.

In (b) performing time synchronization and model synchronization, when the HIL simulator and the network simulator are initially operated, they may be operated in normal operation states by reading out data or signals indicative of the normal operation states of the HIL simulator and the network simulator from a database storing the data or signals indicative of the normal operation states.

In (c) performing a simulation by receiving data or signals in real time, the HIL simulator may transmit and receive actuation signals or sensor signals relating to the fuel control to and from the actuator/sensor module and may transmit and receive data or signals relating to the SIL protection to and from the protection module, through a time critical function.

In (c) performing a simulation by receiving data or signals in real time, the HIL simulator may receive data or signals relating to the fuel control and the SIL protection from the network simulator and the GTCS in real time to simulate the fuel control and protection function of the gas turbine.

In (c) performing a simulation by receiving data or signals in real time, the HIL simulator may transmit and receive data or signals to and from the GTCS through the actuator/sensor module and the protection module for each of a predetermined period of time, e.g. every 1 ms or less.

In (d) performing a simulation relating to auxiliary control and non-SIL protection control, the network simulator may transmit and receive data or signals to and from the GTCS through network communication for each of a predetermined period of time, e.g. every 100 ms or less.

In (b) performing time synchronization and model synchronization, the network simulator may check a flag state of the HIL simulator every 10 ms while operating every 100 ms, in which case when it is determined that the HIL simulator is in a flag ON state, the network simulator performs the time synchronization and the signal synchronization by receiving signals from the HIL simulator, and the HIL simulator may check a flag state of the network simulator at 100 ms while operating every 1 ms, in which case when it is determined that the network simulator is in a flag ON state, the HIL simulator performs the time synchronization and the signal synchronization by transmitting and receiving signals to and from the network simulator.

Other aspects, advantages, and features of the system will become more apparent after review of the entire application, including the following sections: Brief Description of the Drawings, Description of Specific Embodiments, and Claims.

BRIEF DESCRIPTION OF THE DRAWINGS

The above and other objects, features and other advantages of the system will be more clearly understood from the following detailed description taken in conjunction with the accompanying drawings, in which.

DESCRIPTION OF SPECIFIC EMBODIMENTS

Reference will now be made in detail to exemplary embodiments of the system, examples of which are illustrated in the accompanying drawings, so as to be realized by a person of ordinary skill in the art. The system may, however, be embodied in different forms and should not be construed as limited to the embodiments set forth herein.

In certain embodiments, the description irrelevant to the system may be omitted to avoid obscuring appreciation of the disclosure. Throughout the disclosure, like reference numerals refer to like parts throughout the various figures and embodiments of the system.

In the whole description, it will be understood that when an element is referred to as being "connected" to another element, it can be "directly connected" to the other element or it can be "indirectly connected" to the other element with other elements being interposed therebetween. In addition, it will be understood that when a component is referred to as being "comprising" and/or "including" any component, it does not exclude other components, but can further comprises the other components unless otherwise specified.

It will be understood that when an element is referred to as being "above" another element, it can be immediately above the other element or intervening elements may also be present. In contrast, when an element is referred to as being "immediately above" another element, there are no intervening elements present.

Although terms such as first, second, and third are used to describe various parts, components, regions, layers, and/or sections, the system is not limited thereto. These terms will be used only to differentiate one part, component, region, layer, or section from other parts, components, regions, layers, or sections. Accordingly, a first part, component, region, layer, or section may be referred to as a second part, component, region, layer, or section without deviating from the scope and spirit of the system.

The terminology used in the specification of the system is for the purpose of describing particular embodiments only and is not intended to limit the system. As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

Spatially-relative terms such as "below", "above", or the like may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" other elements would then be oriented "above" the other elements. The exemplary terms "below" can, therefore, encompass both an orientation of above and below. Since the device may be oriented in another direction such as rotation of 90° or another angle, the spatially-relative terms may be interpreted in accordance with the orientation of the device.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the exemplary embodiments of the system will be described in more detail with reference to the accompanying drawings so as to be realized by a person of ordinary skill in the art. The system may, however, be embodied in different forms and should not be construed as limited to the embodiments set forth herein.

Figure 1:
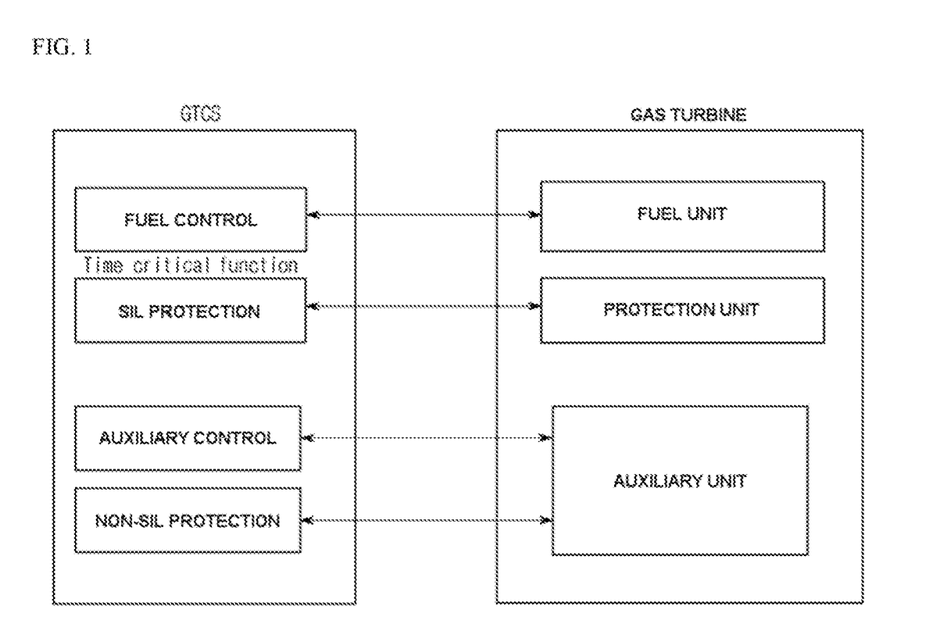
FIG. 1 is a diagram illustrating configurations of a gas turbine control system and a gas turbine that help in understanding operation of a real-time gas turbine simulation system according to an embodiment of the system.

FIG. 1 is a diagram illustrating configurations of a gas turbine control system and a gas turbine that help in understanding operation of a real-time gas turbine simulation system according to an embodiment of the system.

As illustrated in FIG. 1, the gas turbine includes a fuel unit, a protection unit, and an auxiliary unit, based on whether or not there is a time critical condition.

The fuel unit largely includes a combustor for generating combustion gas, a turbine driven by the combustion gas discharged from the combustor, and a compressor for supplying high-pressure air to the combustor. The compressor sucks and compresses outside air when rotating to supply the compressed air to the combustor, and the combustor supplies the compressed air with a fuel for combustion so that the high-temperature and high-pressure combustion gas is generated and then supplied to the turbine. The high-temperature and high-pressure combustion gas discharged from the combustor serves to drive the rotor blades of the turbine and rotate the rotor of the turbine. In the turbine, turbine disk units such as stator blades and rotor blades are alternately provided in the axial direction of the rotor in a multistage manner.

The protection unit stops the operation of the gas turbine to protect the gas turbine under the control of a gas turbine control system (hereinafter, referred to as "GTCS") when the operation of the gas turbine moves closer to a set value.

The fuel unit and the protection unit may include a large number of sensors for checking their states therethrough and may send the result to the GTCS.

The auxiliary unit performs an auxiliary operation in addition to the fuel and protection operation of the gas turbine.

The GTCS is a system for controlling the operation of the gas turbine. The GTCS controls the supply of a gas fuel to the fuel unit and controls a safety integrity level (hereinafter, referred to as "SIL") protection function for the protection unit.

Here, the SIL protection function serves to protect the gas turbine from failure or damage by setting a gas pressure, an air pressure of the compressor, or the like as a certain value and stopping the operation of the gas turbine when the gas pressure, the air pressure, or the like moves closer to the certain value.

Accordingly, the fuel control and the SIL protection function performed in the GTCS correspond to a time critical function since operation control over time is important to them.

As described in the related art, since input and output signals are verified using network communication when the control operation of the GTCS is verified by simulating the gas turbine controlled by the GTCS, the items requiring verification may not be verified in real time.

However, the system is to utilize a hybrid simulator formed by the combination of two simulators, as the simulator for simulating the gas turbine.

One simulator may be connected to the GTCS through one or more hardwires to verify a system level and a time critical type logic in real time for an actuator/sensor module and a protection module, and the other simulator may be connected to the GTCS through a network to verify the auxiliary control and non-SIL protection function of the GTCS using network communication.

That is, the system is to utilize a hybrid simulator formed by the combination of a hardwire-in-the-loop (HIL) simulator with a network simulator, as the simulator for the gas turbine.

Figure 2:
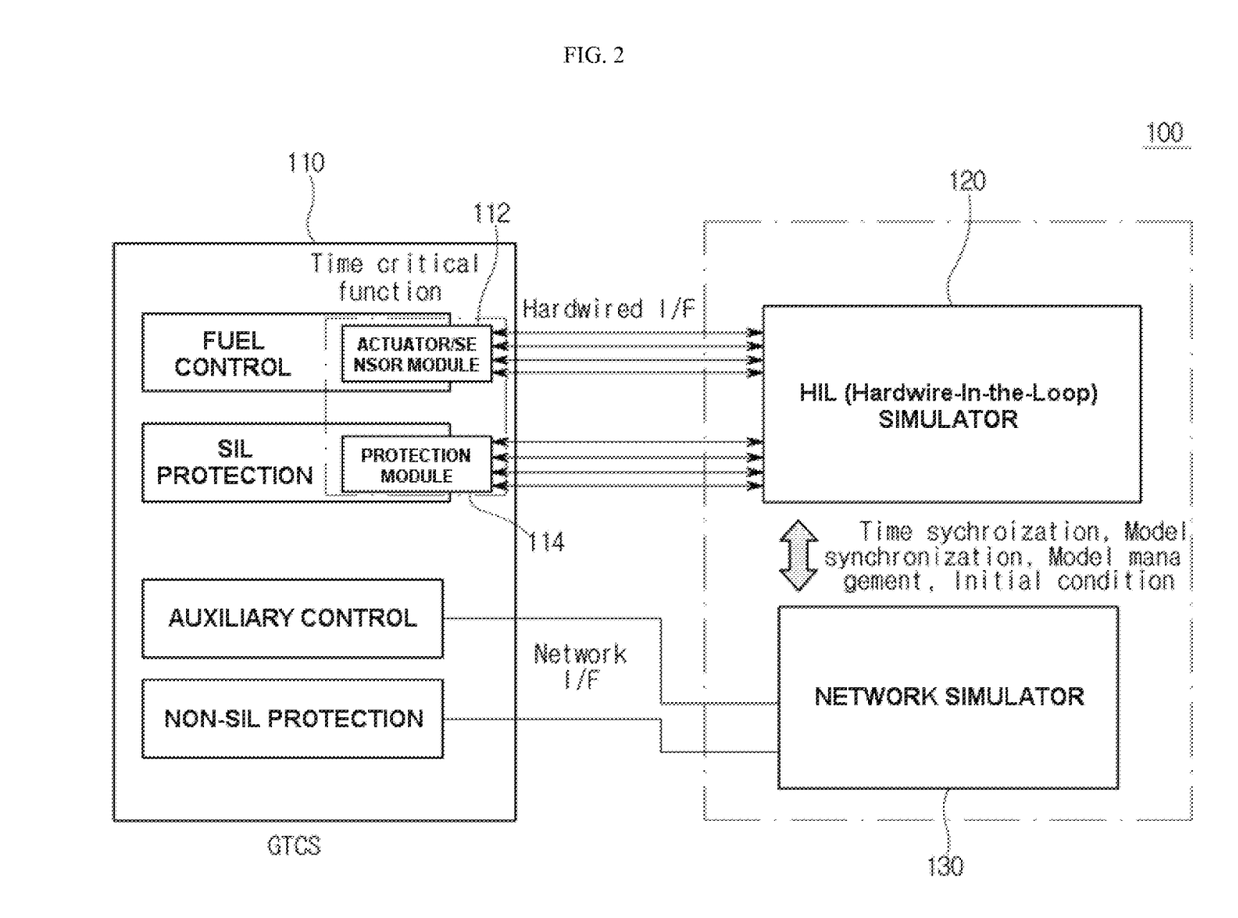
FIG. 2 is a block diagram illustrating the overall configuration of the real-time gas turbine simulation system according to an embodiment of the system.

FIG. 2 is a block diagram illustrating the overall configuration of the real-time gas turbine simulation system according to the embodiment of the system.

Referring to FIG. 2, the real-time gas turbine simulation system, which is designated by reference numeral 100, according to the embodiment of the system includes a hardwire-in-the-loop (hereinafter, referred to as "HIL") simulator 120 connected to a gas turbine control system (hereinafter, referred to as "GTCS") 110 through hardwires, and a network simulator 130 connected to the GTCS 110 through a network.

The GTCS 110 controls a gas fuel through an actuator/sensor module 112 and controls a safety integrity level (SIL) protection function through a protection module 114 for the gas turbine. Here, the actuator/sensor module 112 serves the operation control of actuators for driving the gas turbine and the operation control of sensors for detecting the operation or signals of the gas turbine.

The HIL simulator 120 is connected to the actuator/sensor module 112 and protection module 114 of the GTCS 110 through one or more hardwires and simulates the fuel unit or protection unit of the gas turbine by receiving data or signals in real time from the actuator/sensor module 112 or protection module 114 of the GTCS 110 and receiving data or signals from the network simulator 130.

The network simulator 130 is connected to the GTCS 110 through a network, and simulates the auxiliary unit, which performs the auxiliary control and the non-SIL protection function except for the fuel control and the SIL protection function control, in real time.

That is, for simulation of the gas turbine, the HIL simulator 120 transmits and receives actuation signals or sensor signals relating to gas control to and from the actuator/sensor module 112 of the GTCS 110 and transmits and receives data or signals relating to SIL protection to and from the protection module 114 of the GTCS 110, through a time critical function. In addition, the network simulator 130 transmits and receives signals or data relating to auxiliary control or non-SIL protection to and from the GTCS 110 through network communication. Accordingly, the HIL simulator 120 simulates the operation of the fuel unit and protection unit of the gas turbine by receiving the data or signals from the actuator/sensor module 112 and the protection module 114 of the GTCS 110 and receiving the data or signals from the network simulator 130.

The HIL simulator 120 operates at high speed by transmitting and receiving data or signals to and from the GTCS 110 through the hardwires every 1 ms or less.

In addition, the network simulator 130 operates at low speed by transmitting and receiving data or signals to and from the GTCS 110 through the network every 100 ms or less.

The HIL simulator 120 is connected to the network simulator 130 through hardwires or a network (e.g. Ethernet), and time synchronization and model synchronization are performed between the HIL simulator 120 and the network simulator 130 in order for the HIL simulator 120 and the network simulator 130 to operate similarly to an actual gas turbine. The time synchronization and the model synchronization used herein will be described in more detail with reference to FIGS. 4 and 5.

Accordingly, the real-time gas turbine simulation system 100 according to the embodiment of the system is to embody the hybrid simulator formed by the combination of the HIL simulator 120, which is connected to the GTCS 110 through the hardwires to operate at high speed, with the network simulator 130 which is connected to the GTCS 110 through the network to operate at low speed.

Figure 3:
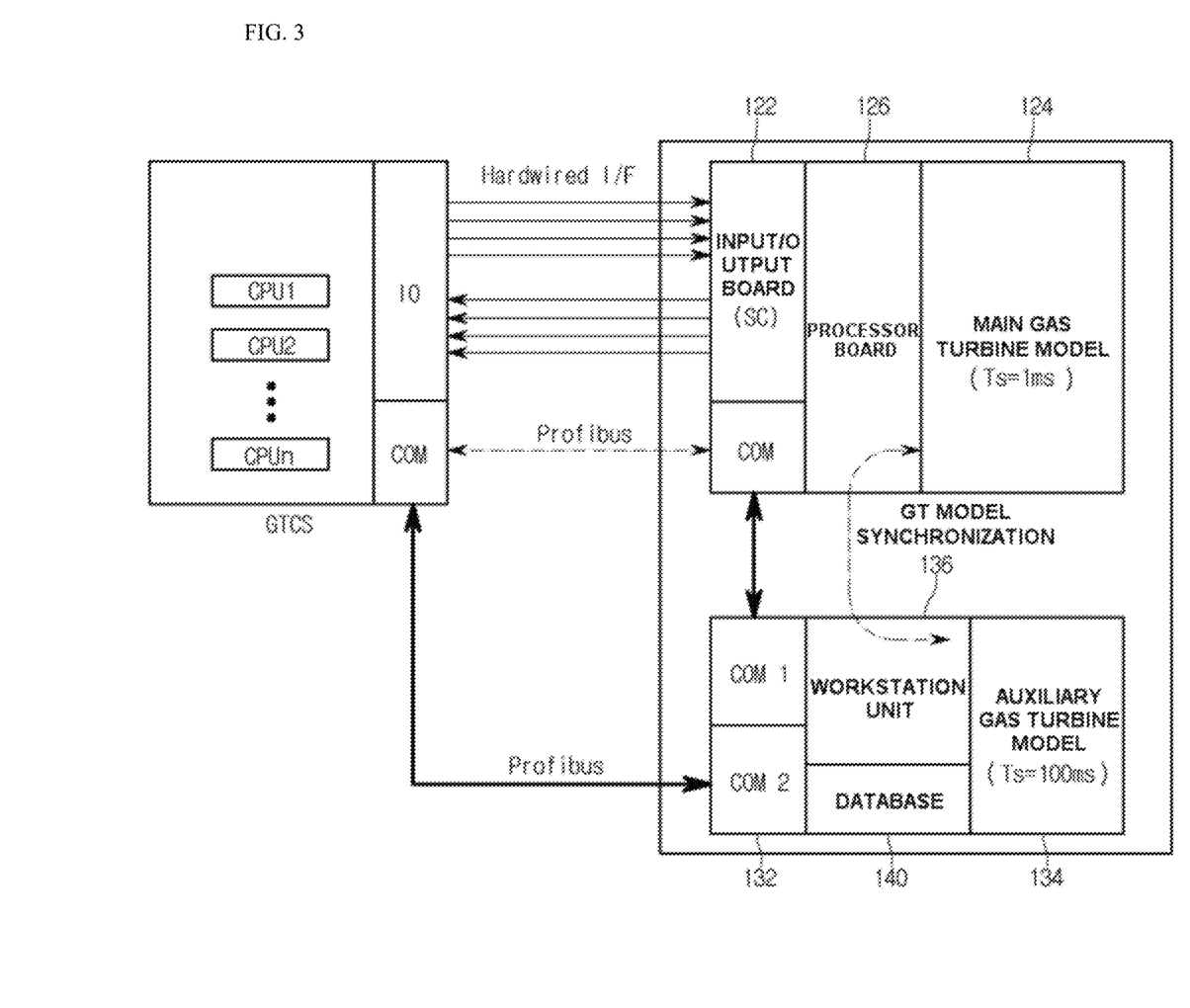
FIG. 3 is a block diagram illustrating detailed configurations of an HIL simulator and a network simulator according to an embodiment of the system.

FIG. 3 is a block diagram illustrating the detailed configurations of the HIL simulator and the network simulator according to an embodiment of the system.

As illustrated in FIG. 3, the HIL simulator 120 includes an input/output board 122 for transmitting and receiving data or signals, relating to valve control commands and conditions for gas turbine operation control and conditions, gas turbine speed and output, and gas pressure, to and from the GTCS 110, a main gas turbine model 124 that generates control and operation signals suitable therefor in response to the data or signals input through the input/output board to output or use the control and operation signals for calculation, and a processor board 126 that sends the data or signals input through the input/output board to the main gas turbine model or sends the operation result of the main gas turbine model to the input/output board.

In this case, the input/output board 122 may include a signal conditioning (SC) unit that converts the analog discrete signals input from the GTCS 110 into digital data to input the digital data to the main gas turbine model 124 or adjusts the signals to the specifications of the sensor or actuator of the actuator/sensor module 122, and a communication (COM) unit that performs network communication with the GTCS 110 for transmitting and receiving data or signals to and from the network simulator 130.

As illustrated in FIG. 3, the network simulator 130 includes a communication (COM1/COM2) unit 132 for communication with the HIL simulator 120 or communication with the GTCS 110, an auxiliary gas turbine (GT) model 134 that simulates gas turbine control in response to the data or signals, relating to auxiliary control and non-SIL protection control, received from the GTCS 110 through the communication unit 132, and a workstation unit 136 that sends the simulation operation signals of the HIL simulator 120 and the network simulator 130 input from a user to the main gas turbine model 124 and the auxiliary gas turbine model 134 and displays the operation state of the gas turbine based on the operation results of the main gas turbine model 124 and the auxiliary gas turbine model 134 such that the user may check the operation state of the gas turbine.

Here, the workstation unit 136 may include an operation and display unit (not illustrated in FIG. 3) through which the user directly sets model information of devices, such as high-pressure and low-pressure turbines, high-pressure stop and control valves, and low-pressure stop and control valves for gas turbine control and operates an increase of turbine speed and increase and decrease of turbine power for simulation. For example, a graphic user interface (GUI) such as a touch screen may be used to display turbine speed, turbine power, operation states of each device, or the like as numerical data such that the user visually immediately checks the operation states of the turbine.

Accordingly, the user or operator may select one of a plurality of gas turbine power generation systems using the workstation unit 136 and may select a specific model from the selected gas turbine power generation system.

Meanwhile, the real-time gas turbine simulation system 100 according to an embodiment of the system may further include a database 140 that stores data or signals indicative of the normal operation states of the HIL simulator 120 and the network simulator 130 when the HIL simulator 120 and the network simulator 130 are initially operated and then normally operated after a certain time has elapsed.

In this case, the database 140 may be included in the network simulator 130 including the workstation unit 136, as illustrated in FIG. 3, or may be a separate device that is not included in the HIL simulator 120 and the network simulator 130.

Accordingly, when the HIL simulator 120 and the network simulator 130 are initially operated, they are immediately operated in the normal operation states in response to the data or signals, indicative of the normal operation states thereof, stored in the database 140.

Figure 4:
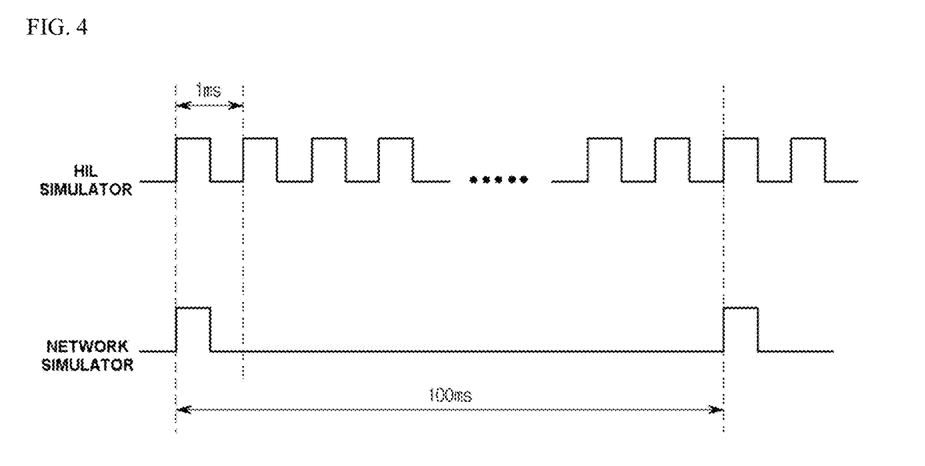
FIGS. 4 and 5 are diagrams illustrating time synchronization and signal synchronization between the HIL simulator and the network simulator according to an embodiment of the system.
Figure 5:
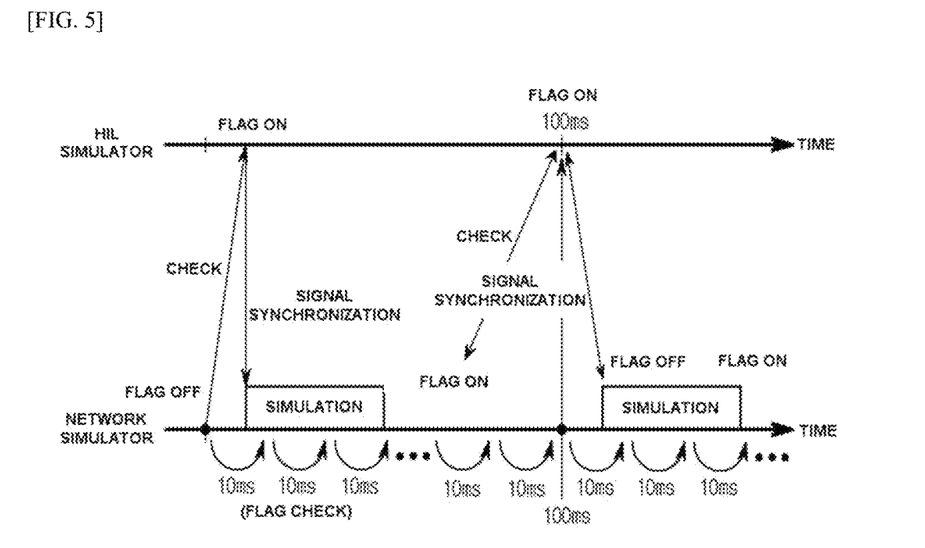

FIGS. 4 and 5 are diagrams illustrating time synchronization and signal synchronization between the HIL simulator and the network simulator according to an embodiment of the system.

As illustrated in FIG. 4, the HIL simulator 120 is updated by receiving data or signals from the GTCS 110 each of a predetermined time period (e.g. every 1 ms), and the network simulator 130 is updated by receiving data or signals from the GTCS 110 each of a predetermined time period (e.g. every 100 ms). Here, their updates are to update the data or signals transmitted and received to or from the HIL simulator 120 and the network simulator 130 as well as the operations of the HIL simulator 120 and the network simulator 130.

In an embodiment of the system, the number of signals transmitted and received between the GTCS 110 and the simulators is approximately 1,500 when the operation of the gas turbine is simulated. In this case, 250 signals, which are important in terms of time critical and protection aspects, are processed at high speed in the HIL simulator 120, whereas the remaining 1,250 signals are processed at low speed in the network simulator 130.

Thus, there is a need for time synchronization and signal synchronization between the HIL simulator 120 and the network simulator 130 which have different processing speeds.

As illustrated in FIG. 5, the network simulator 130 checks the flag state of the HIL simulator 120 every 10 ms while operating every 100 ms. When it is determined that the HIL simulator 120 is in a flag ON state, the network simulator 130 performs signal synchronization in response to the signals received from the HIL simulator 120. After the network simulator 130 performs the signal synchronization, it receives data or signals from the GTCS 110 for execution of simulation. When it is determined that the simulation is completed, the state of the network simulator 130 is changed to a flag ON state.

Meanwhile, the HIL simulator 120 checks the flag state of the network simulator 130 at 100 ms while operating every 1 ms. When it is determined that the network simulator 130 is in a flag ON state, the HIL simulator 120 performs signal synchronization with the network simulator 130 by transmitting and receiving signals to and from the network simulator 130.

In this case, after the network simulator 130 performs signal synchronization by transmitting and receiving signals to and from the HIL simulator 120, it performs simulations by receiving data or signals from the GTCS 110 when it is determined that the HIL simulator 120 is in a flag ON state.

Figure 6:
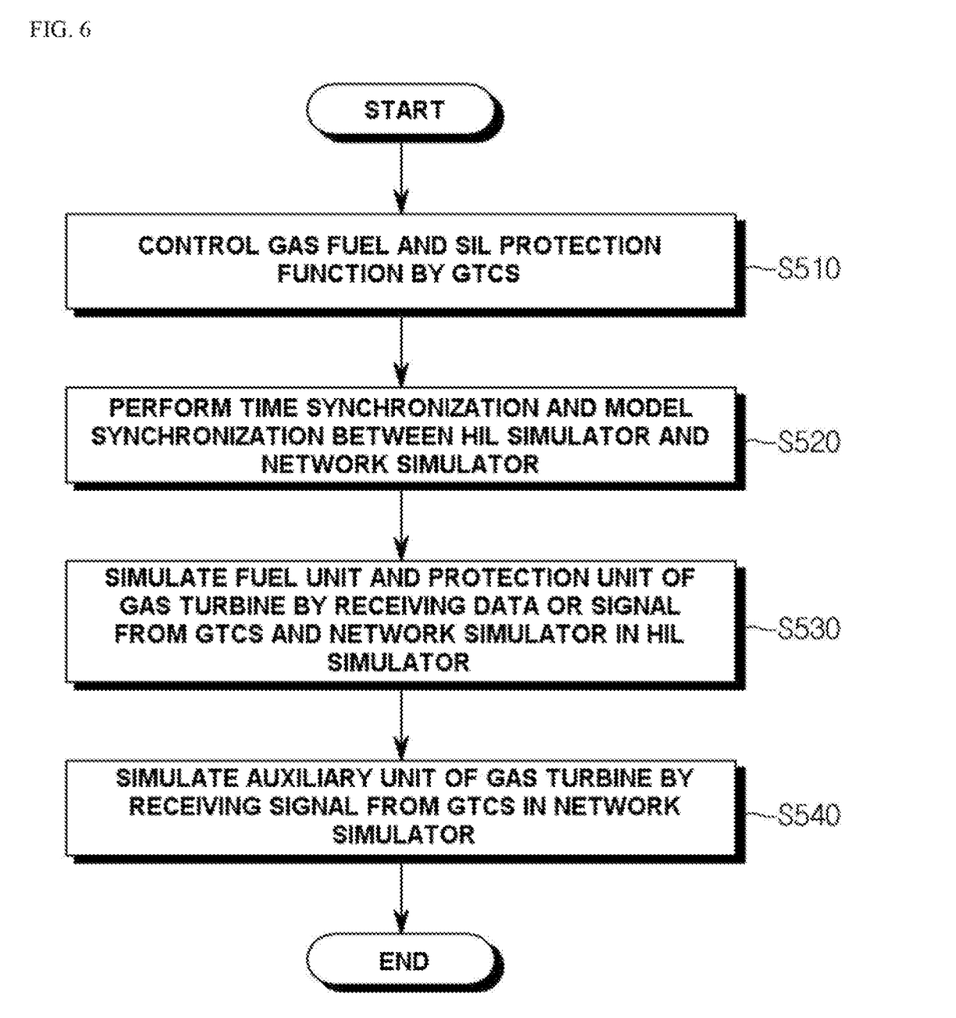
FIG. 6 is a flowchart for explaining a real-time gas turbine simulation method according to another embodiment of the system.

FIG. 6 is a flowchart for explaining a real-time gas turbine simulation method according to another embodiment of the system.

The real-time gas turbine simulation system 100 according to an embodiment of the system performs the following real-time simulation operation process in a state in which an HIL simulator 120 is connected to a GTCS 110 through one or more hardwires and a network simulator 130 is connected to the GTCS 110 through a network.

Referring to FIG. 6, the GTCS 110 controls a gas fuel through an actuator/sensor module 112 and a safety integrity level (SIL) protection function through a protection module for the gas turbine (S510). That is, the GTCS 110 sends command signals relating to the control of the gas fuel and command signals relating to the control of the SIL protection function to the HIL simulator 120 and the network simulator 130 that simulate the gas turbine.

Here, the actuator/sensor module 112 functions to control a plurality of sensors and actuators installed on a power plant site for turbine control. In this case, the plurality of sensors may be a sensor for detecting the pressure of gas, a sensor for detecting the speed of the turbine, a sensor for detecting the power of the turbine, and the like. Examples of the actuators may include a valve actuator that opens and closes a control valve for controlling the pressure of gas, a supply actuator that supplies high-pressure air from a compressor, and the like. Devices for the control of the turbine are used on the power plant site, and examples of the devices include high-pressure and low-pressure turbines, a high-pressure stop and control valve, a low-pressure stop and control valve, and the like.

Next, in the real-time gas turbine simulation system 100 according to an embodiment of the system, the HIL simulator 120 and the network simulator 130 receive the command signals relating to the control of the gas fuel and the command signals relating to the control of the SIL protection function from the GTCS 110 to perform time synchronization and model synchronization between the HIL simulator 120 and the network simulator 130 for simulating the gas turbine (S520).

That is, in the real-time gas turbine simulation system 100 according to an embodiment of the system, as described with reference to FIGS. 4 and 5, the HIL simulator 120 is updated for example, every 1 ms and the network simulator 130 is updated, for example, every 100 ms. Thus, for adjustment of synchronization between two simulators, the network simulator 130 checks the flag state of the HIL simulator 120 every for example, 10 ms while operating for example, every 100 ms, in which case when it is determined that the HIL simulator 120 is in a flag ON state, the network simulator 130 performs signal synchronization in response to the signals received from the HIL simulator 120.

In addition, the HIL simulator 120 checks the flag state of the network simulator 130 at 100 ms while operating every 1 ms. When it is determined that the network simulator 130 is in a flag ON state, the HIL simulator 120 performs signal synchronization with the network simulator 130 by transmitting and receiving signals to and from the network simulator 130.

Here, when the HIL simulator 120 and the network simulator 130 are initially operated, they are operated in normal operation states without waiting by reading out data or signals indicative of normal operation states of the HIL simulator 120 and the network simulator 130 from a database 140 storing the data or signals indicative of the normal operation states. In general, a power generation-related simulator is initially operated and then operated in a normal operation state after from approximately 30 minutes to approximately 1 hour. Therefore, in order for the HIL simulator 120 and the network simulator 130 to be initially operated and then operated immediately in the normal operation states without waiting, the data or signals indicative of the normal operation states of the HIL simulator 120 and the network simulator 130 are stored in the database 140. Thus, when the HIL simulator 120 and the network simulator 130 are initially operated, they are immediately operated in the normal operation states by reading out the data or signals indicative of the normal operation states.

Next, the HIL simulator 120 receives data or signals in real time through the actuator/sensor module 112 or the protection module 114 from the GTCS 110 and receives data or signals relating to fuel control and protection function control from the network simulator 130, to simulate the fuel unit and protection unit of the gas turbine (S530).

That is, the HIL simulator 120 receives data or signals in real time through the actuator/sensor module 112 or the protection module 114 from the GTCS 110 to simulate the time critical function of the gas turbine.

Thus, the HIL simulator 120 transmits and receives actuation signals or sensor signals relating to gas control to and from the actuator/sensor module 112 and transmits and receives data or signals relating to SIL protection to and from the protection module 114, through the time critical function.

In this case, the HIL simulator 120 is operated at high speed by transmitting and receiving data or signals every 1 ms or less through the actuator/sensor module 112 and the protection module 114 from the GTCS 110.

The HIL simulator 120 according to an embodiment of the system performs a simulation or a verification mode through a main gas turbine model 124. Here, the main gas turbine model 124 stores control algorithms used to control the GTCS 110 on the power plant site.

The HIL simulator 120 performs the simulation through the control algorithms of the main gas turbine model 124 and generates control and operation signals suitable for the device to send or use the control and operation signals for calculation.

For example, when a valve requirement value is input to the HIL simulator 120, the HIL simulator 120 calculates turbine power and speed values, suitable for the main gas turbine model 124, from the input valve requirement value to output them.

Thus, the main gas turbine model 124 performs a simulation, based on the turbine power and speed values sent thereto, to send the resultant value thereof to the GTCS 110 and the workstation unit 136 so that an operator checks it. In this case, the main gas turbine model 124 may call and use the control algorithms of devices used in the power plant according to the selection of the operation and display unit of the workstation unit 136. The main gas turbine model 124 and the workstation unit 136 may be configured to exchange data with a remote operation and display unit through an interface or exchange data with a plurality of operation and display units.

Meanwhile, regarding to the "verification mode", the HIL simulator 120 may verify whether software such as control algorithm is abnormal, hardware is abnormal, a turbine control system is maintained as appropriate, or the like for the GTCS 110, through the main gas turbine model 124, in the state in which the HIL simulator 120 is directly connected through hardwires to the GTCS 110 on the power plant site, and may monitor the reaction states or the like of devices for turbine control on the site. In this mode, since the devices for turbine control are not used on the site, they are replaced with the main gas turbine model 124 for performing their roles and functions.

When the verification mode is executed so that the user operates turbine speed and power in the GTCS 110 on the site, high-pressure and low-pressure stop and control valve requirement values are calculated in the GTCS 110 to be sent to the HIL simulator 120, and the HIL simulator 120 receives these values through the input/output board 122 to send them to the main gas turbine model 124. The main gas turbine model 124 determines a valve position value from the input high-pressure and low-pressure stop and control valve requirement values, determines and generates turbine speed and power from the valve position value, and sends the generated turbine speed and power to the GTCS 110 through the input/output board 122. The GTCS 110 performs calculation based on the result of the turbine speed and power and inputs the high-pressure and low-pressure stop and control valve requirement values to the HIL simulator 120 through the input/output board 122 again to satisfy user's turbine speed and power requirement values, thereby forming one closed loop control. In this control process, the verification mode is completed when the execution thereof is stopped.

Meanwhile, the network simulator 130 performs a simulation relating to auxiliary control and non-SIL protection function control, except for the fuel control and the SIL protection function control, in real time (S540).

That is, in the real-time gas turbine simulation system 100 according to an embodiment of the system, the network simulator 130 performs the simulation relating to the auxiliary control and the non-SIL protection function control, which are not time critical in the gas turbine, in real time by receiving data and signals from the GTCS 110.

Thus, the network simulator 130 transmits and receives signals or data relating to the auxiliary control and the non-SIL protection function control to and from the GTCS 110 through network communication.

In this case, the network simulator 130 is operated at low speed by transmitting and receiving data or signals to and from the GTCS 110 through network communication every 100 ms or less.

Meanwhile, the HIL simulator 120 and the network simulator 130 according to an embodiment of the system may perform a simulation in which they are not directly connected to the GTCS 110 on the power plant site, but the operator virtually reproduces the control operation of the turbine in the same state as the site through the workstation unit 136, the main gas turbine model 124, and the auxiliary gas turbine model 134 in a "simulated operation mode". That is, this mode is used for work experience and training of unskilled operators. In this mode, since devices for turbine control are not used on the site, they are replaced with the auxiliary gas turbine model 134 for performing their roles and functions.

When the simulated operation mode is executed so that the user operates a turbine speed or power requirement value in the workstation unit 136, the HIL simulator 120 and the network simulator 130 send the turbine speed or power requirement value to the main gas turbine model 124. The main gas turbine model 124 generates high-pressure and low-pressure stop and control valve requirement values for satisfying a user's requirement value, based on the input turbine speed or power requirement value, determines a valve position from the generated high-pressure and low-pressure stop and control valve requirement values, and determines and generates turbine speed and power from the determined valve position. The main gas turbine model 124 performs calculation based on the control algorithm for satisfying the user's turbine speed and power operation values and calculates high-pressure and low-pressure stop and control valve requirement values to output them to the processor board 126, thereby forming one closed loop control.

When the user's turbine speed or power operation value is satisfied in this control process, the process waits until the user operates next turbine speed or power. The simulated operation mode is completed when the execution thereof is stopped.

All of the "simulation", the "verification mode" and the "simulated operation mode" described above are by way of example only, and the system is not limited thereto. The hybrid simulator may be applied to other operations.

As described above, the system can embody the real-time gas turbine simulation system and the execution method thereof, capable of verifying the input and output signals of an actual GTCS by simulating the gas turbine in real time to reduce trial and error in power plant operation in the gas turbine power generation system that produces electricity by driving the turbine with gas fuel.

In accordance with exemplary embodiments of the system, in the case where a gas turbine control system (GTCS) for controlling a gas turbine is simulated, since the simulation is performed in an environment similar to connection of actual sensors and actuators by directly connecting time critical type input and output with hardwire interface, it is possible to verify the GTCS in real time for items requiring verification.

In addition, since it is unnecessary to directly connect all signals for verification of the GTCS, it is possible to reduce costs by verifying non-time critical type input and output signals using network communication.

In addition, it is possible to perform verification by processing time critical type input and output signals at high speed and to perform verification by processing non-time critical type input and output signals at low speed.

Furthermore, since a hardware-based simulator is implemented for simulation of signal levels similar to actual sensors and actuators, it is possible to verify time critical functions and system levels as well as the logic of the GTCS. Therefore, it is possible to improve reliability of the GTCS.

While the system has been particularly shown and described with reference to exemplary embodiments thereof, it will be understood by those skilled in the art that various changes in form and details may be made therein without departing from the spirit and scope of the system as defined by the appended claims. The exemplary embodiments should be considered in descriptive sense only and not for purposes of limitation. Therefore, the scope of the system is defied not by the detailed description of the system but by the appended claims, and all differences within the scope will be construed as being included in the system.

What is claimed is:

1. A real-time gas turbine simulation system that simulates a gas turbine to verify a gas turbine control system (hereinafter, referred to as "GTCS") for controlling a gas fuel through an actuator/sensor module and controlling a safety integrity level (hereinafter, referred to as "SIL") protection function through a protection module for the gas turbine, the real-time gas turbine simulation system comprising:
   a hardwire-in-the-loop (hereinafter, referred to as "HIL") simulator connected to the actuator/sensor module and the protection module through one or more hardwires to simulate a time critical portion of the gas turbine in real time; and
   a network simulator connected to the GTCS through a network to simulate a non-time critical portion of the gas turbine in real time.

2. The real-time gas turbine simulation system according to claim 1, wherein the HIL simulator transmits and receives actuation signals or sensor signals relating to the fuel control to and from the actuator/sensor module and transmits and receives data or signals relating to the SIL protection to and from the protection module, through a time critical function.

3. The real-time gas turbine simulation system according to claim 1, wherein the HIL simulator receives data or signals relating to the fuel control and the SIL protection from the network simulator and the GTCS in real time to simulate the fuel control and protection function of the gas turbine.

4. The real-time gas turbine simulation system according to claim 1, wherein the HIL simulator transmits and receives data or signals to and from the actuator/sensor module and protection module of the GTCS for each of a predetermined period of time.

5. The real-time gas turbine simulation system according to claim 1, wherein the network simulator transmits and receives data or signals to and from the GTCS through the network for each of a predetermined period of time.

6. The real-time gas turbine simulation system according to claim 1, wherein the HIL simulator is connected to the network simulator through a hardwire or network, and time synchronization and model synchronization are performed between the HIL simulator and the network simulator in order for the HIL simulator and the network simulator to operate similarly to an actual gas turbine.

7. The real-time gas turbine simulation system according to claim 1, wherein the HIL simulator comprises:
   an input/output board for transmitting and receiving data or signals, relating to valve control commands and conditions for gas turbine operation control and conditions, gas turbine speed and output, and gas pressure, to and from the GTCS;
   a main gas turbine model configured to generate control and operation signals suitable therefor in response to the data or signals input through the input/output board to output or use the control and operation signals for calculation; and
   a processor board configured to send the data or signals input through the input/output board to the main gas turbine model or send an operation result of the main gas turbine model to the input/output board.

8. The real-time gas turbine simulation system according to claim 7, wherein the input/output board comprises:
   a signal conditioning unit configured to convert analog signals input from the GTCS into digital data to input the digital data to the main gas turbine model or to adjust output signals of the main gas turbine model to input specifications of the actuator/sensor module; and a communication (COM) unit for performing network communication with the GTCS to transmit and receive data or signals to and from the network simulator.

9. The real-time gas turbine simulation system according to claim 1, wherein the network simulator comprises:
a communication unit for communication with the HIL simulator or the GTCS;
an auxiliary gas turbine model configured to simulate the gas turbine in response to data or signals, relating to auxiliary control and non-SIL protection control, received through the communication unit from the GTCS; and
a workstation unit configured to send simulation operation signals of the HIL simulator and the network simulator input from a user to a main gas turbine model and the auxiliary gas turbine model and to display an operation state of the gas turbine, based on operation results of the main gas turbine model and the auxiliary gas turbine model, such that the user checks the operation state of the gas turbine.

10. The real-time gas turbine simulation system according to claim 1, further comprising a database configured to store data or signals indicative of normal operation states of the HIL simulator and the network simulator when the HIL simulator and the network simulator are initially operated and then normally operated after a certain time has elapsed,
wherein when the HIL simulator and the network simulator are initially operated, they are operated in the normal operation states in response to the data or signals, indicative of the normal operation states, stored in the database.

11. A real-time gas turbine simulation method in a system in which a hardwire-in-the-loop (hereinafter, referred to as "HIL") simulator is connected to a gas turbine control system (hereinafter, referred to as "GTCS") through one or more hardwires and a network simulator is connected to the GTCS through a network, the real-time gas turbine simulation method comprising:
(a) controlling a gas fuel through an actuator/sensor module and controlling a safety integrity level (hereinafter, referred to as "SIL") protection function through a protection module for a gas turbine in the GTCS;
(b) performing time synchronization and model synchronization between the HIL simulator and the network simulator;
(c) performing a simulation by receiving data or signals in real time through the actuator/sensor module or the protection module in the HIL simulator; and
(d) performing a simulation relating to auxiliary control and non-SIL protection control, except for the fuel control and the SIL protection function control, in real time in the network simulator.

12. The real-time gas turbine simulation method according to claim 11, wherein, in (b) performing time synchronization and model synchronization, when the HIL simulator and the network simulator are initially operated, they are operated in normal operation states by reading out data or signals indicative of the normal operation states of the HIL simulator and the network simulator from a database storing the data or signals indicative of the normal operation states.

13. The real-time gas turbine simulation method according to claim 11, wherein, in (c) performing a simulation by receiving data or signals in real time, the HIL simulator transmits and receives actuation signals or sensor signals relating to the fuel control to and from the actuator/sensor module and transmits and receives data or signals relating to the SIL protection to and from the protection module, through a time critical function.

14. The real-time gas turbine simulation method according to claim 11, wherein, in (c) performing a simulation by receiving data or signals in real time, the HIL simulator receives data or signals relating to the fuel control and the SIL protection from the network simulator and the GTCS in real time to simulate the fuel control and protection function of the gas turbine.

15. The real-time gas turbine simulation method according to claim 11, wherein, in (c) performing a simulation by receiving data or signals in real time, the HIL simulator transmits and receives data or signals to and from the GTCS through the actuator/sensor module and the protection module for each of a predetermined period of time.

16. The real-time gas turbine simulation method according to claim 11, wherein, in (d) performing a simulation relating to auxiliary control and non-SIL protection control, the network simulator transmits and receives data or signals to and from the GTCS through network communication for each of a predetermined period of time.

17. The real-time gas turbine simulation method according to claim 11, wherein, in (b) performing time synchronization and model synchronization,
the network simulator checks a flag state of the HIL simulator every 10 ms while operating every 100 ms, in which case when it is determined that the HIL simulator is in a flag ON state, the network simulator performs the time synchronization and the signal synchronization by receiving signals from the HIL simulator, and
the HIL simulator checks a flag state of the network simulator at 100 ms while operating every 1 ms, in which case when it is determined that the network simulator is in a flag ON state, the HIL simulator performs the time synchronization and the signal synchronization by transmitting and receiving signals to and from the network simulator.

* * * * *